(12) United States Patent
Krishnamoorthy

(10) Patent No.: US 11,055,433 B2
(45) Date of Patent: Jul. 6, 2021

(54) CENTRALIZED ADVANCED SECURITY PROVISIONING PLATFORM

(71) Applicant: BANK OF AMERICA CORPORATION, Charlotte, NC (US)

(72) Inventor: Madhusudhanan Krishnamoorthy, Chennai (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 329 days.

(21) Appl. No.: 16/239,257

(22) Filed: Jan. 3, 2019

(65) Prior Publication Data
US 2020/0218825 A1 Jul. 9, 2020

(51) Int. Cl.
| | |
|---|---|
| *G06F 21/62* | (2013.01) |
| *G06N 3/08* | (2006.01) |
| *G06N 3/04* | (2006.01) |
| *H04L 29/06* | (2006.01) |
| *H04L 9/14* | (2006.01) |
| *G06F 21/60* | (2013.01) |
| *H04L 9/08* | (2006.01) |
| *H04L 9/00* | (2006.01) |

(52) U.S. Cl.
CPC ........ *G06F 21/6245* (2013.01); *G06F 21/602* (2013.01); *G06N 3/04* (2013.01); *G06N 3/088* (2013.01); *H04L 9/008* (2013.01); *H04L 9/083* (2013.01); *H04L 9/14* (2013.01); *H04L 63/20* (2013.01)

(58) Field of Classification Search
CPC ... G06F 21/6245; G06F 21/602; G06N 3/088; G06N 3/04; G06N 3/08; G06N 3/0472; G06N 3/126; G06N 3/0454; H04L 63/20; H04L 9/14; H04L 9/083; H04L 9/008; H04L 63/0428
See application file for complete search history.

(56) References Cited

U.S. PATENT DOCUMENTS

| | | |
|---|---|---|
| 5,140,530 A | 8/1992 | Guha et al. |
| 5,249,259 A | 9/1993 | Harvey |
| 5,651,099 A | 7/1997 | Konsella |
| 5,841,947 A | 11/1998 | Nordin |
| 6,493,686 B1 | 12/2002 | Francone et al. |
| 6,917,926 B2 | 7/2005 | Chen et al. |
| 8,681,973 B2 | 3/2014 | Weinman |

(Continued)

*Primary Examiner* — Henry Tsang
(74) *Attorney, Agent, or Firm* — Michael A. Springs; Moore & Van Allen PLLC; Nicholas C. Russell

(57) ABSTRACT

Embodiments of the present invention provide a system for providing a centralized advanced security provisioning platform to create reliable machine learning models and also to enhance the existing machine learning models. The system is configured for executing instructions in the privacy module to monitor and control data privacy and data usage, executing instructions in the security module to preserve the authenticity of data that is used by the machine learning models to predict an outcome, executing instructions in the equality module to detect and prevent biasing of the machine learning models, executing instructions in the transparency module to provide transparency associated with the decision making process employed by the machine learning models, and executing instructions in the accuracy enhancement module to enhance the accuracy of machine learning models.

20 Claims, 6 Drawing Sheets

(56) References Cited

U.S. PATENT DOCUMENTS

| | | | |
|---|---|---|---|
| 8,925,075 B2 | 12/2014 | Krendelev et al. | |
| 9,306,738 B2 | 4/2016 | Loftus et al. | |
| 9,489,630 B2 | 11/2016 | Achin et al. | |
| 9,548,861 B2 | 1/2017 | Isshiki | |
| 9,825,758 B2 | 11/2017 | Feng et al. | |
| 9,946,970 B2 | 4/2018 | Gilad-Bachrach et al. | |
| 10,075,288 B1 | 9/2018 | Khedr et al. | |
| 2003/0018595 A1* | 1/2003 | Chen | G06K 9/6228 706/12 |
| 2008/0019511 A1 | 1/2008 | Akiyama et al. | |
| 2010/0094767 A1 | 4/2010 | Miltonberger | |
| 2012/0213359 A1 | 8/2012 | Troncoso Pastoriza et al. | |
| 2013/0097417 A1 | 4/2013 | Lauter et al. | |
| 2014/0115321 A1* | 4/2014 | Isshiki | H04L 9/14 713/153 |
| 2014/0233726 A1 | 8/2014 | Yajima et al. | |
| 2014/0279762 A1 | 9/2014 | Xaypanya et al. | |
| 2016/0217384 A1* | 7/2016 | Leonard | G06N 5/02 |
| 2017/0316285 A1* | 11/2017 | Ahmed | G06K 9/6223 |
| 2018/0165554 A1* | 6/2018 | Zhang | G06K 9/6256 |
| 2019/0172564 A1* | 6/2019 | Chandra | G06N 20/00 |
| 2020/0145384 A1* | 5/2020 | Chauhan | H04L 63/0428 |

\* cited by examiner

CENTRALIZED ADVANCED SECURITY PROVISIONING PLATFORM

BACKGROUND

Currently, machine learning is being used in a variety of fields to make significant decisions based on predictions or classifications. However, current machine learning models may output erroneous predictions and classifications due to malicious external influences which can be catastrophic when machine learning models are being used to take critical business or life decisions. As such, there exists a need for a new and modified artificial intelligence technology for creating new and efficient machine learning models and for modifying existing machine learning models.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for providing a centralized advanced security provisioning platform to create reliable machine learning models and also to enhance the existing machine learning models. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. The one or more memory devices may further comprise a centralized advanced security provisioning platform, the centralized advanced security provisioning platform comprising one or more modules, wherein the one or more modules include at least a privacy module, a security module, an equality module, a transparency module, an accuracy enhancement module, a transformation module, and a cryptography module, wherein the one or more modules comprise instructions executable by one or more processing devices operatively coupled to the one or more memory devices. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention executes instructions in the privacy module to (1) provide differential privacy capabilities to one or more machine learning models, and (2) provide encryption capabilities to the one or more machine learning models, executes instructions in the security module to (1) train the one or more machine learning models using Generative Adversarial Networks, and (2) provide centroid balancing capabilities to the one or more machine learning models, executes instructions in the equality module to (1) provide disparity metrics to the one or more machine learning models, (2) provide bias tolerance levels to the one or more machine learning models, and (3) provide debiasing capabilities to the one or more machine learning models, executes instructions in the transparency module to (1) provide visualization capabilities to the one or more machine learning models and (2) provide explanation capabilities to the one or more machine learning models, executes instructions in the accuracy enhancement module to provide enhancing capabilities to the one or more machine learning models, executes instructions in the transformation module to create one or more advanced machine learning models combining functionalities provided by the privacy module, the security module, the equality module, transparency module, and the accuracy enhancement module, and executes instructions in the cryptography module to provide encryption keys associated with the one or more advanced machine learning models to one or more users.

In some embodiments, the present invention receives input from the one or more users, wherein the input is associated with the execution of the one or more advanced machine learning models and in response to receiving the input from the one or more users, execute the one or more advanced machine learning models, wherein upon execution the one or more advanced machine learning models produce an outcome.

In some embodiments, in response to executing the one or more advanced machine learning models, the one or more advanced machine learning models receive sample data from at least user different from the one or more users, identify that the sample data received from the at least one user is from a distribution, and in response to identifying that the sample data received from the one or more users is from the distribution, provide an output to the one or more users.

In some embodiments, in response to executing the one or more advanced machine learning models, the one or more advanced machine learning models receive sample data from at least user different from the one or more users, identify that the sample data is not from a distribution, in response to identifying that the sample data is from the distribution, dynamically generate random noise data, and provide an output to the at least one user, wherein the output comprises the noise data.

In some embodiments, in response to executing the one or more advanced machine learning models, the one or more advanced machine learning models receive a request from the one or more users to access raw data associated with the one or more advanced machine learning models, wherein the raw data comprises sensitive information, identify that the one or more users do not have access to the raw data associated with the one or more advanced machine learning models, perform homomorphic encryption on the raw data, and display encrypted raw data to the one or more users.

In some embodiments, in response to executing the one or more advanced machine learning models, the one or more advanced machine learning models receive input data from the one or more users, wherein the input data is used by the one or more advanced machine learning models to predict an outcome, identify if the input data is associated with a distribution, wherein the distribution is associated with the training of the one or more advanced machine learning models, and produce the outcome and display the outcome to the one or more users.

In some embodiments, in response to executing the one or more advanced machine learning models, the one or more advanced machine learning models receive training data from the one or more users, wherein the training data is utilized by the one or more users to train the one or more advanced machine learning models, identify that the training data received from the one or more users is tampered, and terminate the one or more advanced machine learning models that are trained with the training data.

In some embodiments, in response to executing the one or more advanced machine learning models, the one or more advanced machine learning models calculating a centroid of the training data, compare the centroid of the training data with a centroid of original training data received from a third party resource, identify that the centroid of the training data does not match the centroid of the original training data, and determine that the training data received from the one or more users is tampered.

In some embodiments, in response to executing the one or more advanced machine learning models, the one or more advanced machine learning models identify one or more metrics that are associated with predicting the outcome, wherein the one or more metrics are based on input data provided by the one or more users for predicting the outcome, compare the one or more metrics with predefined reference metrics and sensitive metrics, based on the comparison of the one or more metrics with the predefined reference metrics and sensitive metrics, determine that one or more advanced machine learning models are biased, de-bias the one or more advanced machine learning models by dynamically generating random data to nullify the effects of a part of the input data that is associated with biasing the one or more advanced machine learning models combining the random data with the input data and create a new set of input data, and predicting the outcome using the new set of input data.

In some embodiments, in response to executing the one or more advanced machine learning models, the one or more advanced machine learning models create at least one graph and at least one report associated with the prediction of the outcome, generate a linear equation associated with the prediction of the outcome, wherein the linear equation comprises metrics and weightage of metrics associated with the prediction of the outcome, and display the at least one graph, the at least one report, and the linear equation to the one or more users.

In some embodiments, the one or more modules are placed in a pipeline architecture.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
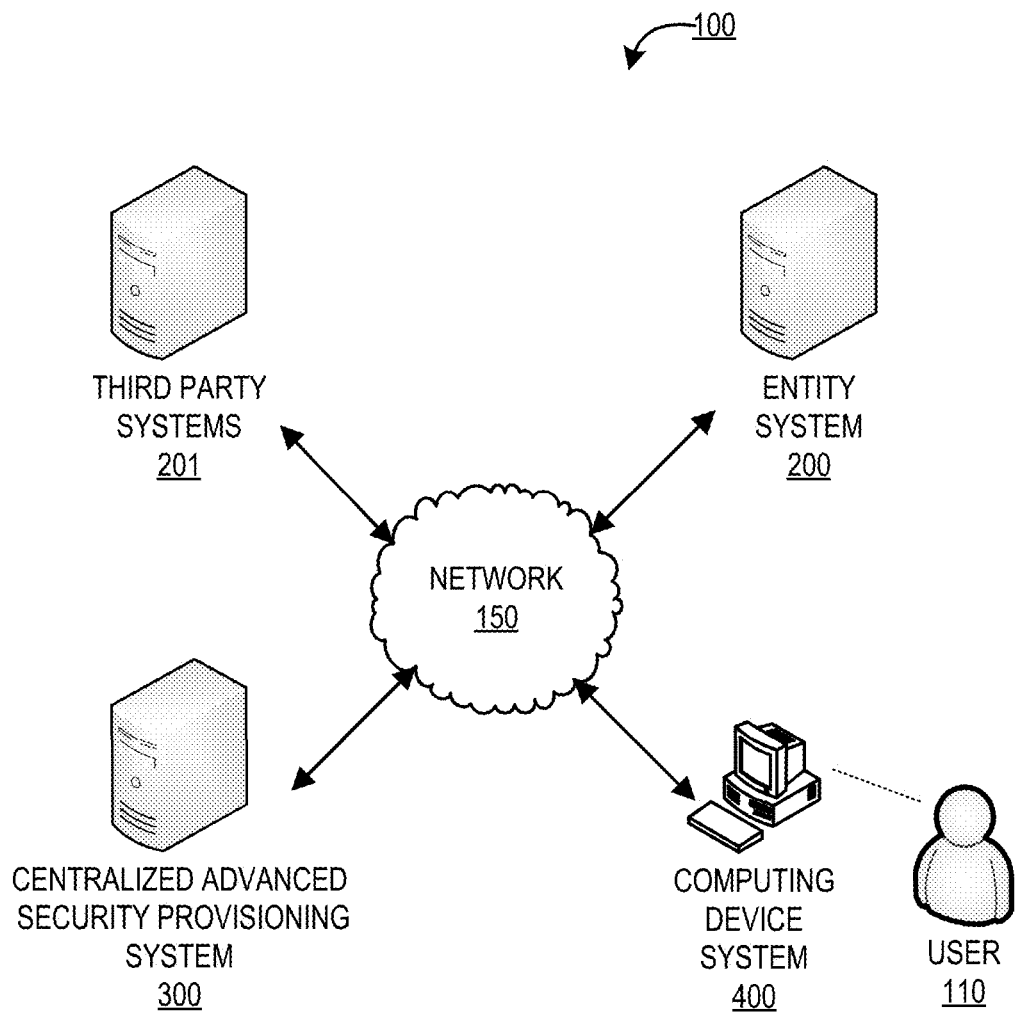
Figure 2:
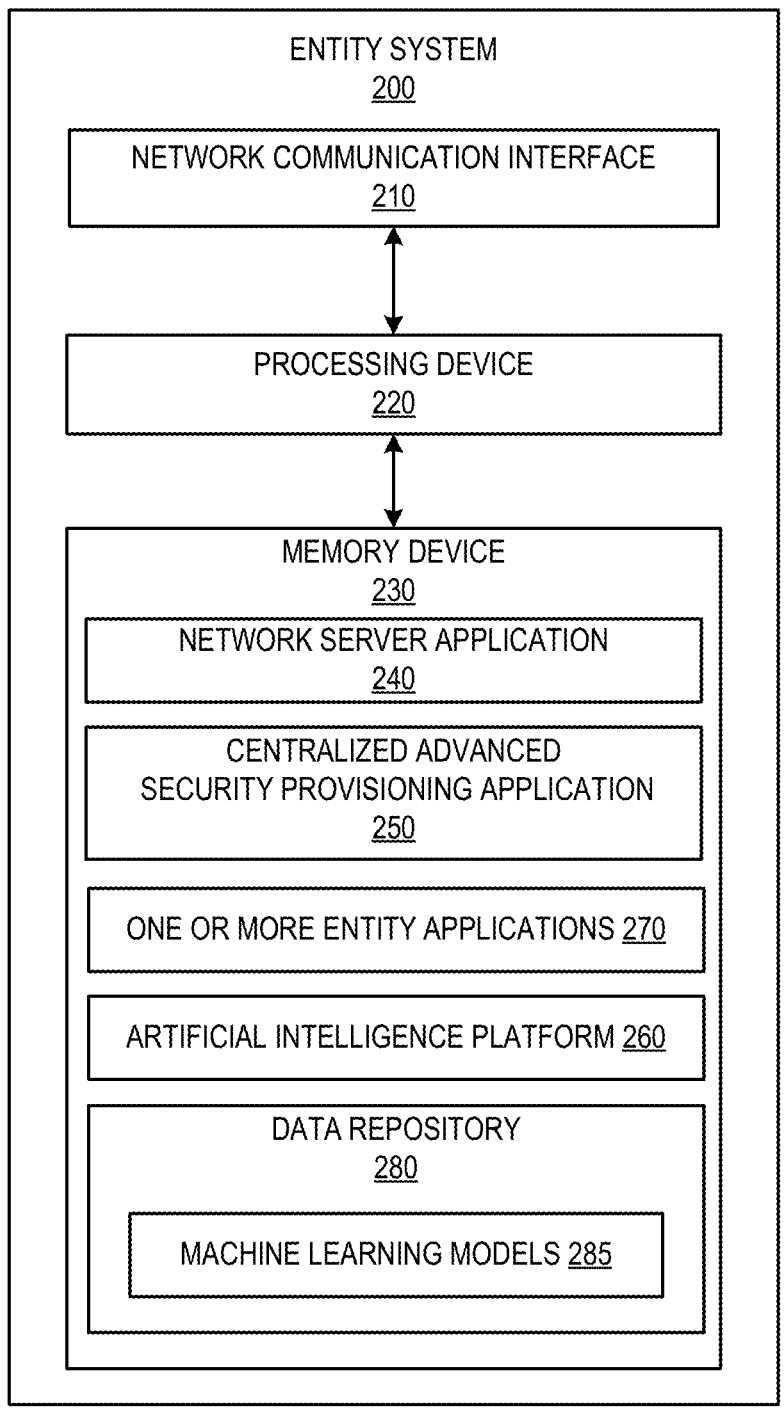
Figure 3:
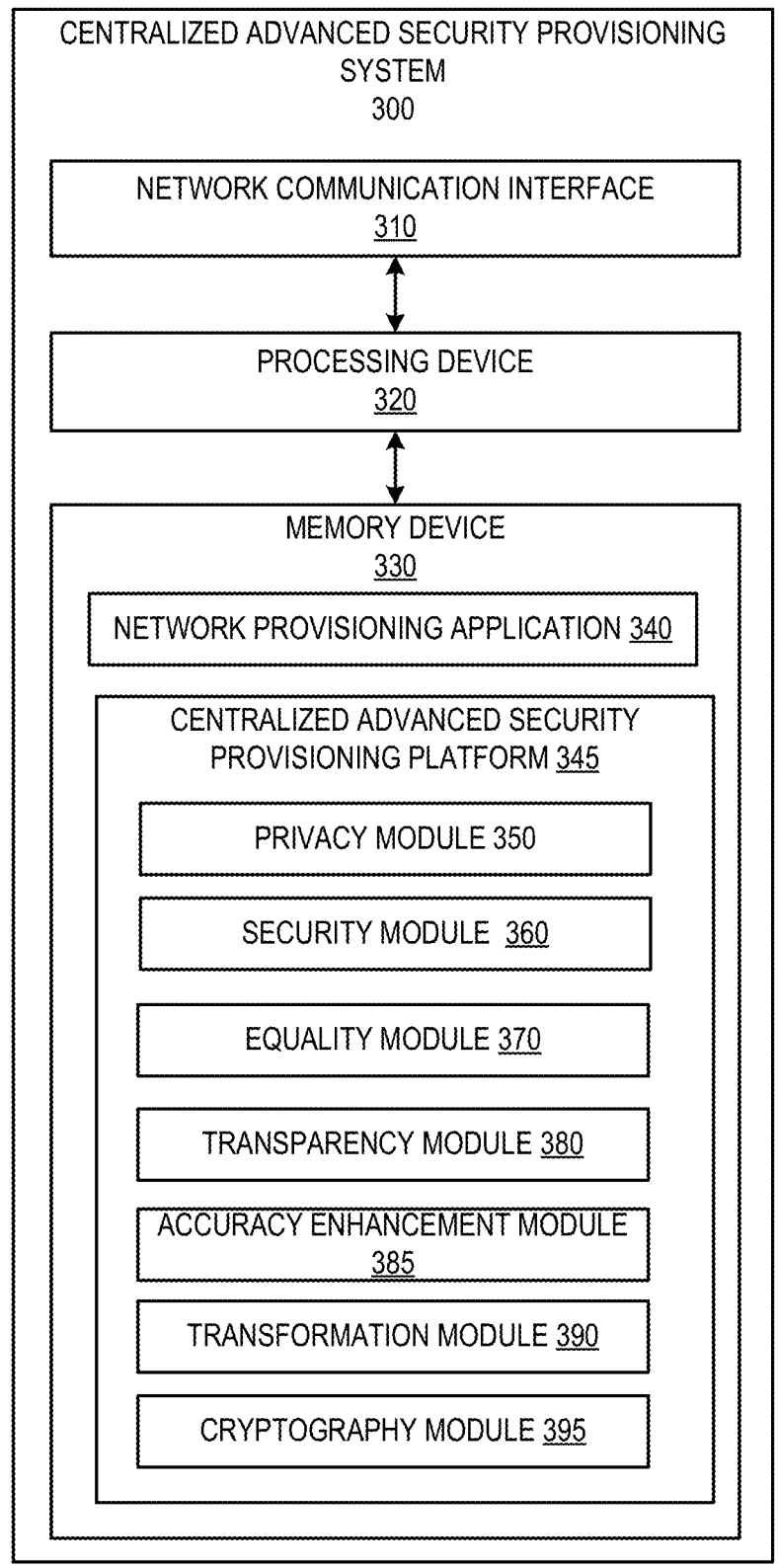
Figure 4:
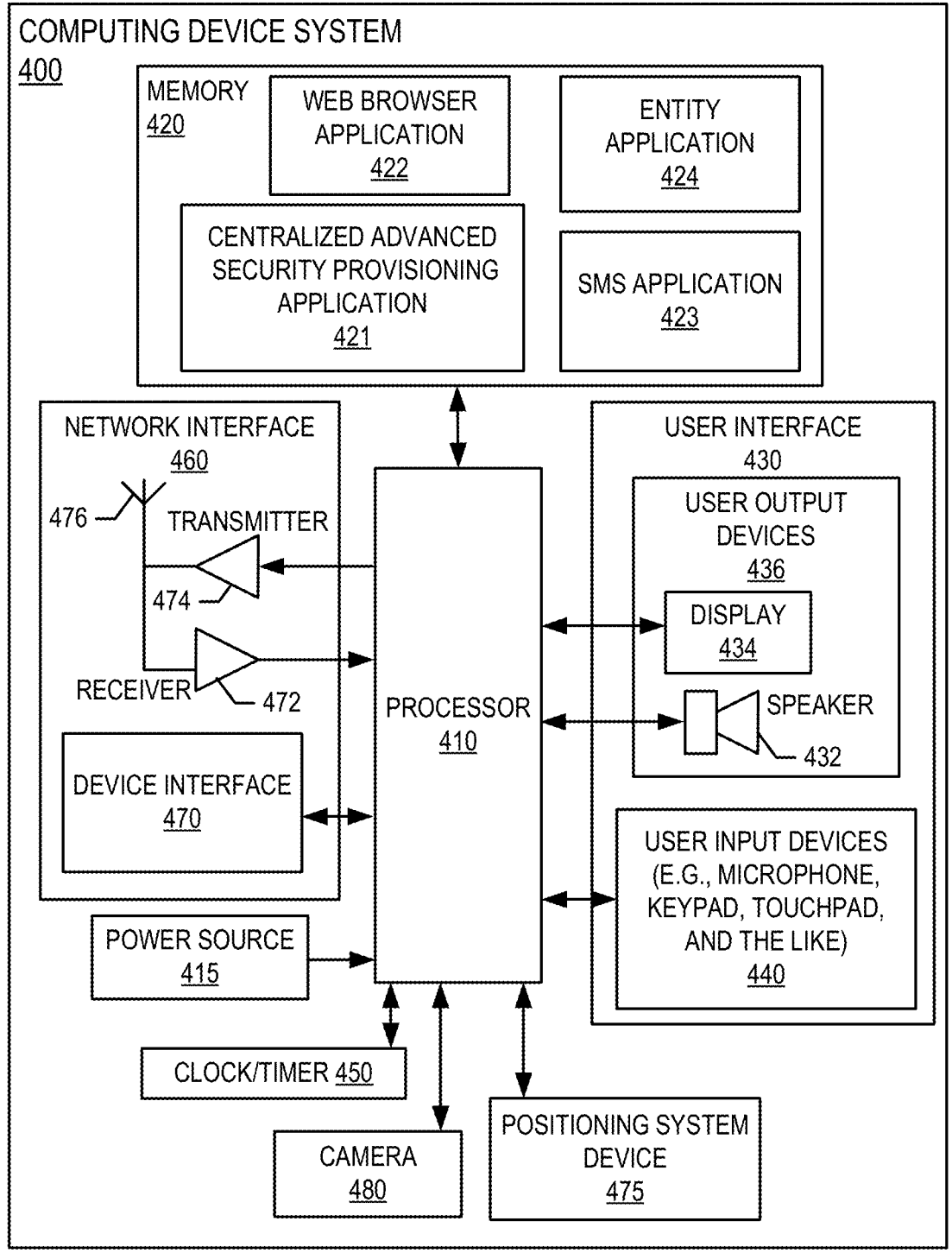
Figure 5:
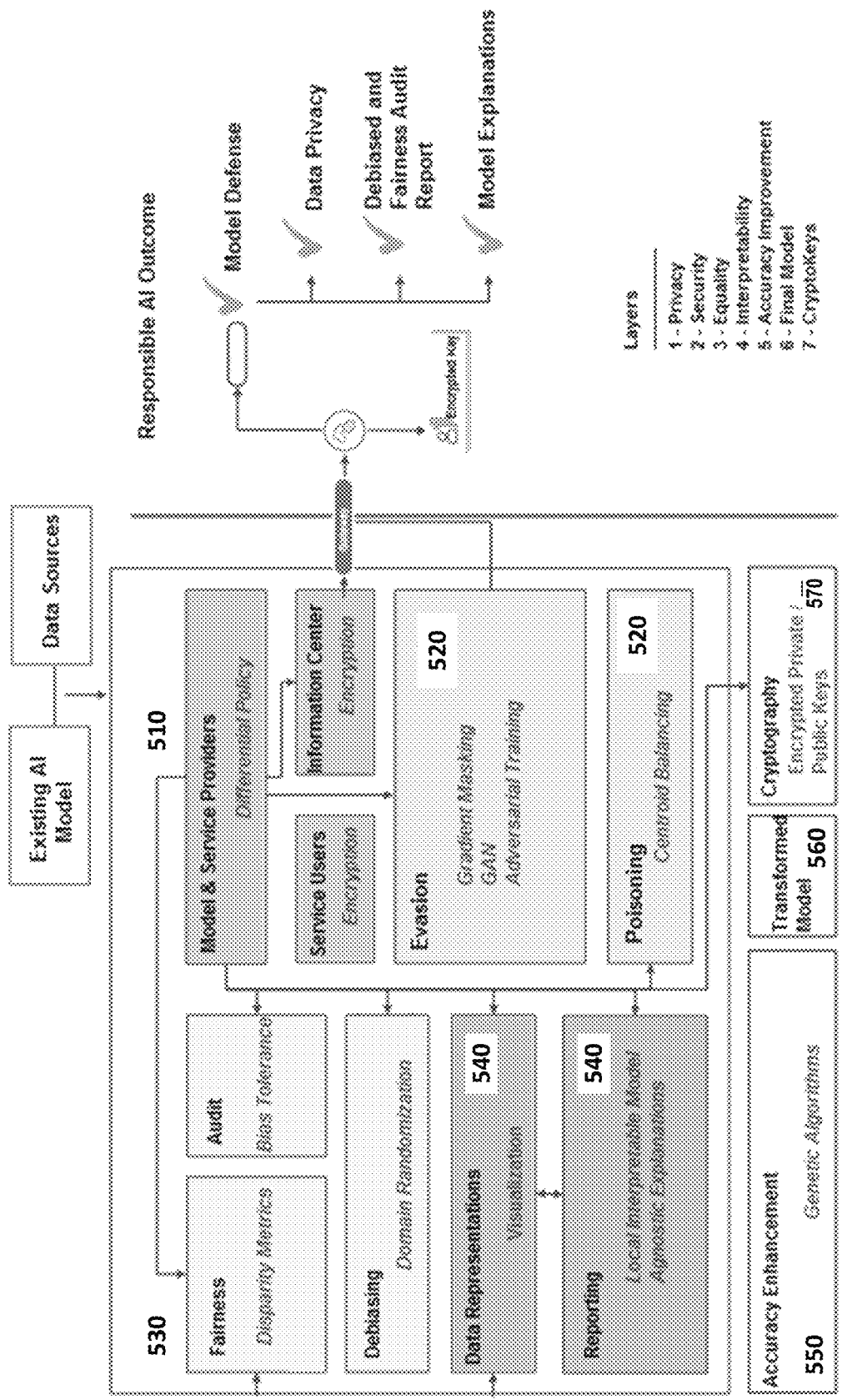
Figure 6:
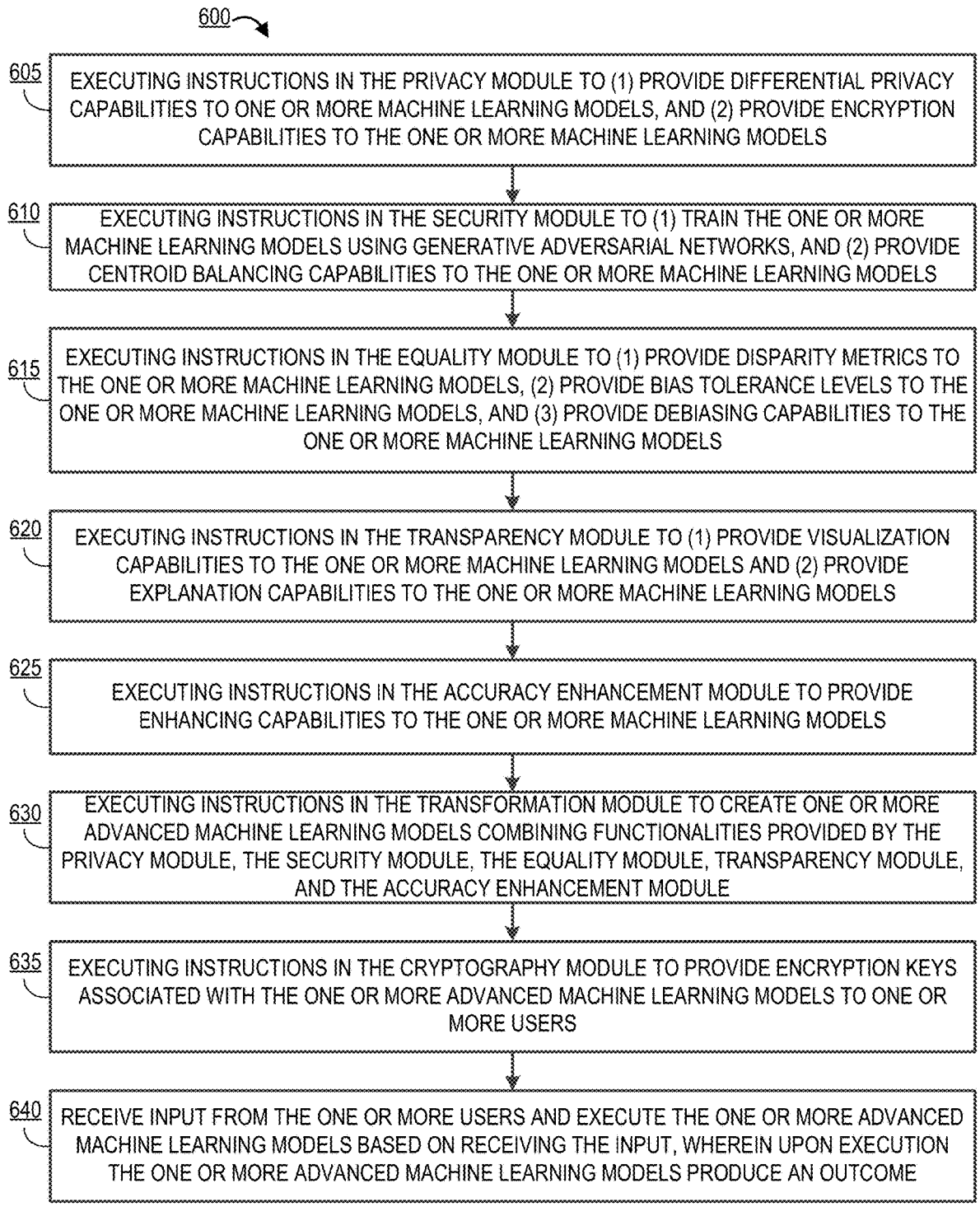

Having thus described embodiments of the invention in general terms, reference will now be made the accompanying drawings, wherein:

FIG. 1 provides a block diagram illustrating a system environment for providing a centralized advanced security provisioning platform to create reliable machine learning models and also to enhance the existing machine learning models, in accordance with an embodiment of the present invention;

FIG. 2 provides a block diagram illustrating the entity system 200 of FIG. 1, in accordance with an embodiment of the present invention;

FIG. 3 provides a block diagram illustrating a centralized advanced security provisioning system 300 of FIG. 1, in accordance with an embodiment of the invention;

FIG. 4 provides a block diagram illustrating the computing device system 400 of FIG. 1, in accordance with an embodiment of the present invention;

FIG. 5 provides a block diagram illustrating the functions of one or more layers in a centralized advanced security provisioning platform provided by the centralized advanced security provisioning system 300, in accordance with an embodiment of the present invention; and FIG. 6 provides a flowchart illustrating a process flow for creating advanced machine learning models, in accordance with an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

With the development of machine learning, expectations for artificial intelligence (AI) technology are increasing day by day. In particular, machine learning has shown enriched performance results in a variety of fields and there are many applications that are closely related to our daily life, such as making significant decisions in application area based on predictions or classifications, in which a Machine Learning (ML) model could be relevant. Hence, if a ML model causes mispredictions or misclassifications due to malicious external influences, it can cause catastrophic complications. Moreover, training Machine Learning models involves relying on an enormous amount of data and the training data often includes sensitive information. Therefore, machine learning models are expected not to expose the privacy of such data. In addition to the aforementioned security aspects, fairness and trustworthiness of Machine Learning models are also very critical. However, current artificial intelligent technology is deficient on all of the above aspects. As such, there exists a need for a new and modified artificial intelligence technology.

The present invention circumvents all the above-noted issues and addresses data privacy, model security, equality audit, and model transparency associated with the machine learning models. The present invention provides complete data privacy in a completed encrypted homomorphic way, blocks external and internal unauthorized access attempts at data level or model level, confirms the fairness of data in all sensitive attributes, allows debiasing of models and data, ensures accuracy of the performance of the models, and makes the decision making process completely transparent to users.

The present invention leverages cryptography, multiparty computation, differential policies, local interpretable model agnostic explanations along with genetic algorithms to enable one or more characteristics of a machine learning model. The present invention trains the existing models and also the new machine learning models with data attributes such as data privacy, security, fairness, interpretability, and accuracy.

Any system associated with an entity may utilize the artificial intelligence platform of the present invention. In some embodiments, the entity may be a financial institution. In other embodiments, the entity may be a non-financial institution. In some embodiments, the entity may be any organization utilizing Machine Learning models. The artificial intelligence platform may be integrated into the entity systems in two ways. First, there may be existing Machine Learning models within the entity systems and the artificial intelligence platform may be used to verify whether the existing Machine Learning models have a desired Responsible Artificial Intelligence (RAI) Index. The RAI index allows a user to identify whether the existing Machine Learning models are governed properly and whether the existing Machine Learning models are secured properly. In the case where the existing machine learning models do not have the desired RAI index, the system of the present invention transforms the existing machine learning models using the artificial intelligence platform. Second, when there are no existing Machine Learning models, but just raw data, training may be performed using the artificial intelligence platform so that the newly created ML model has the desired RAI index.

FIG. 1 provides a block diagram illustrating a system environment 100 for providing a centralized advanced security provisioning platform to create reliable machine learning models and also to enhance the existing machine learning models, in accordance with an embodiment of the invention. As illustrated in FIG. 1, the environment 100 includes an centralized advanced security provisioning system 300, entity system 200, a computing device system 400, and one or more third party systems 201. One or more users 110 may be included in the system environment 100, where the users 110 interact with the other entities of the system environment 100 via a user interface of the computing device system 400. In some embodiments, the one or more user(s) 110 of the system environment 100 may be employees of an entity associated with the entity system 200.

The entity system(s) 200 may be any system owned or otherwise controlled by an entity to support or perform one or more process steps described herein. The entity may be any organization which utilizes, creates, and/or manages machine learning models or artificial intelligence platforms. In some embodiments, the managing entity is a financial institution. In some embodiments, the managing entity is a non-financial institution.

The centralized advanced security provisioning system 300 is a system of the present invention for performing one or more process steps described herein. In some embodiments, the centralized advanced security provisioning system 300 may be an independent system. In some embodiments, the centralized advanced security provisioning system 300 may be a part of the entity system 200.

The centralized advanced security provisioning system 300, the entity system 200, the computing device system 400, and/or the third party systems 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the centralized advanced security provisioning system 300 is configured to communicate information or instructions with the entity system 200, the computing device system 400, and/or the third party systems 201 across the network 150.

The computing device system 400 may be a system owned or controlled by the entity of the entity system 200 and the user 110. As such, the computing device system 400 may be a computing device of the user 110. In general, the computing device system 400 communicates with the user 110 via a user interface of the computing device system 400, and in turn is configured to communicate information or instructions with the centralized advanced security provisioning system 300, entity system 200, and/or the third party systems 201 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, a centralized advanced security provisioning application 250, one or more entity applications 270, an artificial intelligence platform 260, and a data repository 280 comprising machine learning models 285. The computer-executable program code of the network server application 240, the centralized advanced security provisioning application 250, the one or more entity applications 270, and the artificial intelligence platform 260 to perform certain logic, data-extraction, and data-storing functions of the entity system 200 described herein, as well as communication functions of the entity system 200.

The network server application 240, the centralized advanced security provisioning application 250, the one or more entity applications 270, and the artificial intelligence platform 260 are configured to store data in the data repository 280 or to use the data stored in the data repository 280 when communicating through the network communication interface 210 with the centralized advanced security provisioning system 300, the computing device system 400, and/or the third party systems 201 to perform one or more process steps described herein. In some embodiments, the entity system 200 may receive instructions from the centralized advanced security provisioning system 300 via the centralized advanced security provisioning application 250 to perform certain operations. The centralized advanced security provisioning application 250 may be provided by the centralized advanced security provisioning system 300 to transform existing machine learning models created by the artificial intelligence platform 260 or to create new advanced machine learning models. The one or more entity applications 270 may be any of the applications used, created, modified, and/or managed by the entity system 200. The machine learning models 285 store din the data repository 280 may models created by the artificial intelligence platform 260 and/or advanced machine learning models created by the centralized advanced security provisioning system 300.

FIG. 3 provides a block diagram illustrating the centralized advanced security provisioning system 300 in greater detail, in accordance with embodiments of the invention. As illustrated in FIG. 3, in one embodiment of the invention, the centralized advanced security provisioning system 300 includes one or more processing devices 320 operatively coupled to a network communication interface 310 and a memory device 330. In certain embodiments, the centralized advanced security provisioning system 300 is operated by a first entity, such as a financial institution, while in other embodiments, the centralized advanced security provisioning system 300 is operated by an entity other than a financial institution. In some embodiments, the centralized advanced security provisioning system 300 is owned or operated by the entity of the entity system 200. In some embodiments, the centralized advanced security provisioning system 300 may be an independent system. In alternate embodiments, the centralized advanced security provisioning system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the centralized advanced security provisioning system 300 described herein. For example, in one embodiment of the centralized advanced security provisioning system 300, the memory device 330 includes, but is not limited to, a network provisioning application 340 and centralized advanced security provisioning platform 345. The computer-executable program code of the network provisioning application 340, and the centralized advanced security provisioning platform 345 may instruct the processing device 320 to perform certain logic, data-processing, and data-storing functions of the centralized advanced security provisioning system 300 described herein, as well as communication functions of the centralized advanced security provisioning system 300.

The network provisioning application 340 and the centralized advanced security provisioning platform 345 are configured to use or invoke the data in a data repository present in the memory device 330 when communicating through the network communication interface 310 with the entity system 200, the computing device system 400, and/or the third party systems 201. In some embodiments, the network provisioning application 340 the centralized advanced security provisioning platform 345 may store the data extracted or received from the entity system 200, the third party system 201, and the computing device system 400 in a data repository. In some embodiments, the centralized advanced security provisioning platform 345 may create and store the advanced machine learning models in the data repository.

In some embodiments, the centralized advanced security provisioning platform 345 may include at least a privacy module 350, a security module 360, an equality module 370, a transparency module 380, an accuracy enhancement module 385, a transformation module 390, and a cryptography module 395. Each of the one or more modules may comprise instructions to instruct the processing device 320 to perform certain actions described in detail in FIG. 5 and FIG. 6. In some embodiments, the privacy module 350, the security module 360, the equality module 370, the transparency module 380, the accuracy enhancement module 385, the transformation module 390, and the cryptography module 395 may be a part of the single module.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, gaming devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touch-pad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a centralized advanced security provisioning application 421, and an entity application 424. These applications also typically instructions to a graphical user interface (GUI) on the display 430 that allows the user 110 to interact with the entity system 200, the centralized advanced security provisioning system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the centralized advanced security provisioning application 421 provided by the centralized advanced security provisioning system 300 allows the user 110 to access the one or more electronic resources stored in the entity system and/or the centralized advanced security provisioning system 300. In some embodiments, the entity application 424 provided by the entity system 200 and the centralized advanced security provisioning application 421 allow the user 110 to access one or more electronic resources and one or more entity applications 270.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a block diagram illustrating the functions of the one or more layers/modules in a centralized advanced security provisioning platform provided by the centralized advanced security provisioning system 300, in accordance with an embodiment of the present invention. The layer 510 corresponds to the privacy module 350 in FIG. 3, the layer 510 is associated with provisioning data privacy capabilities to the one or more machine learning models created by the advanced security provisioning platform. The layer 510 allows the one or more advanced machine learning models to detect whether sample data that is being sent to the mode is coming from the one or more users 110 or from an unauthorized user via a differential privacy instructions that are embedded into the advanced machine learning models by the computer instructions present in the privacy module 350. The input described herein may be sample data that is coming through one or more application user interfaces associated with the one or more machine learning models. The advanced machine learning models identify whether the input is coming from one or more users 110 or from an unauthorized user based on identifying whether the sample data is associated with a distribution stored in the entity system 200 or the centralized advanced security provisioning system 300. In response to identifying that the sample data is coming from the one or more users, the one or more advanced machine learning models generate an output and display the output to the one or more users 100. In response to identifying that the sample data is coming from an unauthorized user, the one or more advanced machine learning models generate random noise and combine the random noise with the output and display the modified output to the unauthorized user. In some embodiments, the one or more advanced machine learning models display only the random noise to the unauthorized user.

Additionally, the functionalities of layer 510 allow the one or more advanced machine learning models to display data in different formats to the one or more users 100 based on whether the one or more users 100 have authorization to view the data that is associated with the one or more advanced machine learning models. For example, a data scientist may request data from an advanced machine learning model, the system encrypts the data by applying homomorphic encryption and displays the data in an encrypted format to the data scientist. The data in an encrypted format retains the data pattern, but the sensitive information such as personal user information (e.g., Social Security Number) will be encrypted by the model. In another example, when a user from a governance team requests data from an advanced machine learning model, the advanced machine learning model may identify that the user has access to view the data and may display the data in an unencrypted format. In some embodiments, the advanced machine learning models may display the raw data to user from the governance team only after receiving an encryption key from the user.

The layer 520 corresponds to the security module 360 in FIG. 3, the layer 520 is associated with provisioning capabilities associated with security to the one or more machine learning models created by the advanced security provisioning platform. The layer 520 allows the one or more advanced machine learning models to identify whether the data that is being used by the one or more advanced machine learning models is authentic or not. The computer instructions in the security module 360 train the one or more advanced machine learning models with Gradient Adversarial Networks (GAN) which allows the one or more advanced machine learning models to determine the authenticity of data that is being used by the one or more advanced machine learning models to predict an outcome. Training the one or more advanced machine learning models with the Gradient Adversarial Networks allows the one or more advanced machine learning models to remember the data that is used for training the one or more advanced machine learning models. In an exemplary embodiment, the one or more advanced machine learning models may determine the authenticity of data by verifying that the data that is provided by a user for predicting the outcome is associated with a distribution that is used in training the one or more advanced models and may produce an outcome. In alternate embodiments, the machine learning models may determine that the data that is provided by a user for predicting the outcome is not associated with a distribution that is used in training the one or more advanced models and may not produce an outcome. In some embodiments, instead of not producing an outcome, the one or more advanced machine learning models may implement the features provided by layer 530 and produce an outcome.

Additionally, one or more users (e.g., data scientists) train the one or more advanced machine learning models using some training data. The functionalities of layer 520 that are implemented on the one or more advanced machine learning models will allow the one or more advanced machine learning models to identify whether the training data is genuine or not. The one or more advanced machine learning models may identify that the training data is genuine or not by calculating and comparing a centroid of the training data provided by the data scientists with a centroid of the raw training data that is provided to the data scientists by the entity system 200 or the third party entity system 201. The method implemented by the one or more advanced machine learning models to detect whether the training data is genuine or not is centroid balancing as shown in layer 520 of FIG. 5. In response to identifying that the training data is not genuine, one or more advanced machine learning models generate one or more alerts and transmit the one or more alerts to a group of users from a governance team.

The layer 530 corresponds to the equality module 370 in FIG. 3, the layer 530 is associated with provisioning capabilities associated with equality to the one or more advanced machine learning models created by the advanced security provisioning platform. In an exemplary embodiment, where a data scientists provides data that is used by the one or more advanced machine learning models to predict an outcome, the one or more advanced machine learning models identify the one or more metrics that have an outstanding influence on the outcome based on the data provided by the data scientists. The one or more advanced machine learning models then compare the one or more metrics with a group of reference metrics and sensitive metrics and if the one or more metrics are exactly the same as the reference metrics, the one or more advanced machine learning models produce an outcome. In a case, where the one or more metrics match any of the sensitive metrics, the one or more advanced machine learning models identify the at least one sensitive metric from the one or more metrics and generates randomized data to nullify the data that is contributing towards the sensitive metric. For example, if an advanced machine learning model is being used to grant credit card applications and the data provided by the data scientist has data that favors applicants from northern part of the city, the advanced machine learning model generates random data (e.g., data associated with western, eastern, and southern party of the city) to nullify the influence of the data associated with favoring applicants from the northern part of the city.

The layer 540 corresponds to the transparency module 380 in FIG. 3, the layer 540 is associated with provisioning visualization capabilities to the one or more advanced machine learning models created by the advanced security provisioning platform. Typically, the existing one or more machine learning models do not have the capabilities to provide transparency associated with the decision making process to shareholders or users of the machine learning models. The instructions in the transparency module 380 cause the one or more advanced machine learning models to generate graphs and reports associated with the data, metrics, and other factors employed by the one or more advanced machine learning models to predict the outcome. The instructions in the transparency module 380 further cause the one or more advanced machine learning models to generate a linear equation comprising the one or more metrics and weights associated with the one or more metrics that are associated with the decision making process employed by the one or more advanced machine learning models while predicting the outcome.

The layer 550 corresponds to the accuracy enhancement module 385 in FIG. 3, the layer 530 is associated with provisioning accuracy enhancement capabilities to the one or more advanced machine learning models created by the advanced security provisioning platform. The instructions in the accuracy enhancement module 385 comprise a genetic algorithm which causes the one or more advanced machine learning models to change at least one of the one or more metrics used in layer 530 and use one or more metrics associated with higher accuracy to predict the outcome. For example, the genetic algorithm causes the one or more machine learning models to identify that a first parameter and a second parameter are more accurate in predicting an outcome than three other parameters that were employed by the one or more machine learning models to predict the outcome based on the user input.

The layer 560 corresponds to transformation module 390 in FIG. 3, where the layer 560 is associated with creating modified one or more advanced machine learning models after passing the existing machine learning models from layer 510 through layer 550. The existing machine learning models after passing through the first five layers transform into modified one or more advanced machine learning models that have one or more characteristic as explained inn FIG. 6. The layer 570 corresponds to cryptography module 395 in FIG. 3, where the layer 570 is associated with providing any encryption keys that are associated with encryptions performed on the one or more advanced machine learning models to one or more users.

FIG. 6 provides a flowchart illustrating a process flow for creating advanced machine learning models, in accordance with an embodiment of the invention. As illustrated in block 605, the system executes instructions in the privacy module to (1) provide differential privacy capabilities to one or more machine learning models, and (2) provide encryption capabilities to the one or more machine learning models. As explained above, the instructions in the privacy module create the layer 510 in the one or more machine learning models that provides differential privacy capabilities and encryption capabilities to the one or more machine learning models. The differential privacy capabilities allow the one or more machine learning models to identify whether an input that is being received by the one or more machine learning models is coming from one or more users 110 or from an unauthorized user. In an embodiment where the one or more machine learning models identify that the input is coming from the one or more users, the differential privacy capabilities further cause the one or more machine learning models to generate an output and display the output to the one or more users. In an embodiment where the one or more machine learning models identify that the input is coming from an unauthorized user, the differential privacy capabilities further the one or more machine learning models to generate random noise and combine the random noise with the output and display the modified output to the unauthorized user. The encryption capabilities allow the one or more machine learning models to display data in different formats to the one or more users 100 based on whether the one or more users 100 have authorization to view the data that is associated with the one or more advanced machine learning models. The encryption capabilities allow the one or machine learning models to perform homomorphic encryption and weight optimization to manipulate the data and display the data in different formats to different users.

As illustrated in block 610, the system executes instructions in the security module to (1) train the one or more machine learning models using Generative Adversarial Networks, and (2) provide centroid balancing capabilities to the one or more machine learning models. Training the one or more machine learning models using the Generative Adversarial Networks allows the one or more machine learning models to identify whether the data that is being used by the one or more machine learning models to predict an outcome is authentic or not. In one embodiment where the one or machine learning models identify that the data is not authentic, the one or more machine learning models do not produce an outcome. In another embodiment where the one or more machine learning models identify that the data is authentic, the one or more machine learning models produce an outcome. Additionally, the centroid balancing capabilities of the one or more machine learning models allow the one or more machine learning models to identify whether the training data that is used for training the one or more machine learning models is genuine or not. In one embodiment where the one or more machine learning models identify that the training data is not genuine, the machine learning models automatically transmit alerts to one or more users. Additionally, the one or more machine learning models may also prevent the one or more machine learning models from being deployed to a real-time production environment where the one or more machine learning models are used to take real-time business decisions or life decisions.

As illustrated in block 615, the system executes instructions in the equality module to (1) provide disparity metrics to the one or more machine learning models, (2) provide bias tolerance levels to the one or more machine learning models, and (3) provide debiasing capabilities to the one or more machine learning models. Providing disparity metrics may include providing a group of reference metrics and sensitive metrics to the one or more machine learning models. The one or more machine learning models use the group of reference metrics and the sensitive metrics to identify whether the one or more metrics that have an outstanding influence on the outcome are biased by identifying whether the one or more metrics belong to the group of reference metrics or the sensitive metrics. In a case, where the one or more machine learning models identify that the one or more metrics are biased, the one or more machine learning models calculate a percentage by which the one or more machine learning models are biased. The one or more machine learning models may then use the bias tolerance levels to determine whether the calculated percentage is within the bias tolerance levels. The bias tolerance levels are provided to the one or more machine learning models so that the one or more machine learning models neglect the minute authorized changes that are introduced by the data scientists. For example, data scientists may introduce two additional entries of mock data which may not have significant impact on the outcome. In another example, if a data scientist introduces huge of amount of data to influence the machine learning models, it may have significant impact on the outcome and the percentage of bias associated with the one or more machine learning models will not be within the bias tolerance levels. In such a case, the debiasing capabilities of the one or more machine learning models, allow the one or more machine learning models to debias the data by generating randomized data in order to nullify the effect of the huge amount of data that was introduced by the data scientist.

As illustrated in block 620, the system executes instructions in the transparency module to (1) provide visualization capabilities to the one or more machine learning models and (2) provide explanation capabilities to the one or more machine learning models. The visualization capabilities of the one or more machine learning models cause the one or more machine learning models to generate graphs and reports associated with the data, metrics, and other factors employed by the one or more machine learning models to predict the outcome. The explanation capabilities of the one or more machine learning models cause the one or more machine learning models to generate a linear equation comprising the one or more metrics and weights associated with the one or more metrics that are associated with the decision making process employed by the one or more advanced machine learning models while predicting the outcome.

As illustrated in block 625, the system executes instructions in the accuracy enhancement module to provide enhancing capabilities to the one or more machine learning models. The enhancing capabilities of the one or more machine learning models causes the one or more advanced machine learning models to change at least one of the one or more metrics that are used in predicting an outcome and use one or more metrics associated with higher accuracy to predict the outcome. As illustrated in block 630, the system executes instructions in the transformation module to create one or more advanced machine learning models combining functionalities provided by the privacy module, the security module, the equality module, transparency module, and the accuracy enhancement module. The system generates one or more advanced machine learning models that are far more accurate and reliable than the existing machine learning models. As illustrated in block 635, the system executes instructions in the cryptography module to provide encryption keys associated with the one or more advanced machine learning models to one or more users.

As illustrated in block 640, the system receives input from the one or more users and execute the one or more advanced machine learning models based on receiving the input, wherein upon execution the one or more advanced machine learning models produce an outcome.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for providing a centralized advanced security provisioning platform to create responsible machine learning models and to enhance existing machine learning models, the system comprising:
   at least one non-transitory storage device;
   a centralized advanced security provisioning platform stored in the at least one non-transitory storage device, the centralized advanced security provisioning platform comprising one or more modules, wherein the one or more modules include at least a privacy module, a security module, an equality module, a transparency module, an accuracy enhancement module, a transformation module, and a cryptography module, wherein the one or more modules comprise instructions executable by one or more processing devices operatively coupled to one or more memory devices, wherein the one or more processing devices are configured for:
      executing instructions in the privacy module to (1) provide differential privacy capabilities to one or more machine learning models, and (2) provide encryption capabilities to the one or more machine learning models;
      executing instructions in the security module to (1) train the one or more machine learning models using Generative Adversarial Networks, and (2) provide centroid balancing capabilities to the one or more machine learning models, wherein the centroid balancing capabilities cause one or more advanced machine learning models generated by the transformation module to:
         receive training data from one or more users, wherein the training data is utilized by the one or more users to train the one or more advanced machine learning models;
         identify that the training data received from the one or more users is tampered; and
         terminate the one or more advanced machine learning models that are trained with the training data;
      executing instructions in the equality module to (1) provide disparity metrics to the one or more machine learning models, (2) provide bias tolerance levels to the one or more machine learning models, and (3) provide debiasing capabilities to the one or more machine learning models;
      executing instructions in the transparency module to (1) provide visualization capabilities to the one or more machine learning models and (2) provide explanation capabilities to the one or more machine learning models;
      executing instructions in the accuracy enhancement module to provide enhancing capabilities to the one or more machine learning models;
      executing instructions in the transformation module to create the one or more advanced machine learning models combining functionalities provided by the privacy module, the security module, the equality module, transparency module, and the accuracy enhancement module; and
      executing instructions in the cryptography module to provide encryption keys associated with the one or more advanced machine learning models to the one or more users.

2. The system of claim 1, wherein the at least one processing device is further configured to:
   receive input from the one or more users, wherein the input is associated with the execution of the one or more advanced machine learning models; and
   in response to receiving the input from the one or more users, execute the one or more advanced machine learning models, wherein upon execution the one or more advanced machine learning models produce an outcome.

3. The system of claim 2, wherein in response to the at least one processing device executing the one or more advanced machine learning models, the differential privacy capabilities of the one or more advanced machine learning models cause the one or more advanced machine learning models to:
   receive sample data from at least user different from the one or more users;
   identify that the sample data received from the at least one user is from a distribution; and
   in response to identifying that the sample data received from the one or more users is from the distribution, provide an output to the one or more users.

4. The system of claim 2, wherein in response to the at least one processing device executing the one or more advanced machine learning models, the differential privacy capabilities of the one or more advanced machine learning models causes the one or more advanced machine learning models to:
   receive sample data from at least user different from the one or more users;
   identify that the sample data is not from a distribution;
   in response to identifying that the sample data is not from the distribution, dynamically generate random noise data; and
   provide an output to the at least one user, wherein the output comprises the random noise data.

5. The system of claim 2, wherein in response to the at least one processing device executing the one or more advanced machine learning models, the encryption capabilities of the one or more advanced machine learning models cause the one or more advanced machine learning models to:

receive a request from the one or more users to access raw data associated with the one or more advanced machine learning models, wherein the raw data comprises sensitive information;

identify that the one or more users do not have access to the raw data associated with the one or more advanced machine learning models;

perform homomorphic encryption on the raw data; and display encrypted raw data to the one or more users.

6. The system of claim 2, wherein in response to the at least one processing device executing the one or more advanced machine learning models, the one or more advanced machine learning models, based on the training from the Generative Adversarial Networks, are configured to:

receive input data from the one or more users, wherein the input data is used by the one or more advanced machine learning models to predict an outcome;

identify if the input data is associated with a distribution, wherein the distribution is associated with the training of the one or more advanced machine learning models; and produce the outcome and display the outcome to the one or more users.

7. The system of claim 1, wherein the one or more advanced machine learning models identify that the training data received from the one or more users is tampered by:

calculating a centroid of the training data;

compare the centroid of the training data with a centroid of original training data received from a third party resource;

identify that the centroid of the training data does not match the centroid of the original training data; and determine that the training data received from the one or more users is tampered.

8. The system of claim 2, wherein in response to the at least one processing device executing the one or more advanced machine learning models, the debiasing capabilities of the one or more advanced machine learning models cause the one or more advanced machine learning models to:

identify one or more metrics that are associated with predicting the outcome, wherein the one or more metrics are based on input data provided by the one or more users for predicting the outcome;

compare the one or more metrics with predefined reference metrics and sensitive metrics;

based on the comparison of the one or more metrics with the predefined reference metrics and sensitive metrics, determine that one or more advanced machine learning models are biased;

de-bias the one or more advanced machine learning models by:

dynamically generating random data to nullify the effects of a part of the input data that is associated with biasing the one or more advanced machine learning models;

combining the random data with the input data and create a new set of input data; and predicting the outcome using the new set of input data.

9. The system of claim 2, wherein in response to the at least one processing device executing the one or more advanced machine learning models, the visualization capabilities and the explanation capabilities of the one or more advanced machine learning models cause the one or more advanced machine learning models to:

create at least one graph and at least one report associated with prediction of the outcome;

generate a linear equation associated with the prediction of the outcome, wherein the linear equation comprises metrics and weightage of metrics associated with the prediction of the outcome; and display the at least one graph, the at least one report, and the linear equation to the one or more users.

10. The system of claim 1, wherein the one or more modules are placed in a pipeline architecture.

11. A computer program product for providing a centralized advanced security provisioning platform to create responsible machine learning models and to enhance the existing machine learning models, the computer program product comprising a non-transitory computer-readable storage medium having computer executable instructions for causing a computer processor to perform the steps of:

executing instructions in a privacy module to (1) provide differential privacy capabilities to one or more machine learning models, and (2) provide encryption capabilities to the one or more machine learning models;

executing instructions in a security module to (1) train the one or more machine learning models using Generative Adversarial Networks, and (2) provide centroid balancing capabilities to the one or more machine learning models, wherein the centroid balancing capabilities cause one or more advanced machine learning models generated by a transformation module to:

receive training data from one or more users, wherein the training data is utilized by the one or more users to train the one or more advanced machine learning models;

identify that the training data received from the one or more users is tampered; and terminate the one or more advanced machine learning models that are trained with the training data;

executing instructions in an equality module to (1) provide disparity metrics to the one or more machine learning models, (2) provide bias tolerance levels to the one or more machine learning models, and (3) provide debiasing capabilities to the one or more machine learning models;

executing instructions in a transparency module to (1) provide visualization capabilities to the one or more machine learning models and (2) provide explanation capabilities to the one or more machine learning models;

executing instructions in an accuracy enhancement module to provide enhancing capabilities to the one or more machine learning models;

executing instructions in the transformation module to create the one or more advanced machine learning models combining functionalities provided by the privacy module, the security module, the equality module, transparency module, and the accuracy enhancement module; and executing instructions in a cryptography module to provide encryption keys associated with the one or more advanced machine learning models to the one or more users.

12. The computer program product of claim 11, wherein the computer executable instructions further cause the computer processor to:

receive input from the one or more users, wherein the input is associated with the execution of the one or more advanced machine learning models; and in response to receiving the input from the one or more users, execute the one or more advanced machine learning models, wherein upon execution the one or more advanced machine learning models produce an outcome.

13. The computer program product of claim 12, wherein in response to executing the one or more advanced machine learning models, the differential privacy capabilities of the one or more advanced machine learning models causes the one or more advanced machine learning models to:
   receive sample data from at least user different from the one or more users;
   identify that the sample data is not from a distribution;
   in response to identifying that the sample data is not from the distribution, dynamically generate random noise data; and
   provide an output to the at least one user, wherein the output comprises the random noise data.

14. The computer program product of claim 12, wherein in response to executing the one or more advanced machine learning models, the encryption capabilities of the one or more advanced machine learning models cause the one or more advanced machine learning models to:
   receive a request from the one or more users to access raw data associated with the one or more advanced machine learning models, wherein the raw data comprises sensitive information;
   identify that the one or more users do not have access to the raw data associated with the one or more advanced machine learning models;
   perform homomorphic encryption on the raw data; and
   display encrypted raw data to the one or more users.

15. The computer program product of claim 12, wherein in response to executing the one or more advanced machine learning models, the one or more advanced machine learning models, based on the training from the Generative Adversarial Networks, are configured to:
   receive input data from the one or more users, wherein the input data is used by the one or more advanced machine learning models to predict an outcome;
   identify if the input data is associated with a distribution, wherein the distribution is associated with the training of the one or more advanced machine learning models; and
   produce the outcome and display the outcome to the one or more users.

16. The computer program product of claim 12, wherein in response to executing the one or more advanced machine learning models, the debiasing capabilities of the one or more advanced machine learning models cause the one or more advanced machine learning models to:
   identify one or more metrics that are associated with predicting the outcome, wherein the one or more metrics are based on input data provided by the one or more users for predicting the outcome;
   compare the one or more metrics with predefined reference metrics and sensitive metrics;
   based on the comparison of the one or more metrics with the predefined reference metrics and sensitive metrics, determine that one or more advanced machine learning models are biased;
   de-bias the one or more advanced machine learning models by:
      dynamically generating random data to nullify the effects of a part of the input data that is associated with biasing the one or more advanced machine learning models;
      combining the random data with the input data and create a new set of input data; and
      predicting the outcome using the new set of input data.

17. The computer program product of claim 12, wherein in response to executing the one or more advanced machine learning models, the visualization capabilities and the explanation capabilities of the one or more advanced machine learning models cause the one or more advanced machine learning models to:
   create at least one graph and at least one report associated with prediction of the outcome;
   generate a linear equation associated with the prediction of the outcome, wherein the linear equation comprises metrics and weightage of metrics associated with the prediction of the outcome; and
   display the at least one graph, the at least one report, and the linear equation to the one or more users.

18. A computerized method for providing a centralized advanced security provisioning platform to create responsible machine learning models and to enhance the existing machine learning models, the method comprising:
   executing instructions in a privacy module to (1) provide differential privacy capabilities to one or more machine learning models, and (2) provide encryption capabilities to the one or more machine learning models;
   executing instructions in a security module to (1) train the one or more machine learning models using Generative Adversarial Networks, and (2) provide centroid balancing capabilities to the one or more machine learning models, wherein the centroid balancing capabilities cause one or more advanced machine learning models generated by a transformation module to:
      receive training data from one or more users, wherein the training data is utilized by the one or more users to train the one or more advanced machine learning models;
      identify that the training data received from the one or more users is tampered; and
   terminate the one or more advanced machine learning models that are trained with the training data;
   executing instructions in a equality module to (1) provide disparity metrics to the one or more machine learning models, (2) provide bias tolerance levels to the one or more machine learning models, and (3) provide debiasing capabilities to the one or more machine learning models;
   executing instructions in a transparency module to (1) provide visualization capabilities to the one or more machine learning models and (2) provide explanation capabilities to the one or more machine learning models;
   executing instructions in a accuracy enhancement module to provide enhancing capabilities to the one or more machine learning models;
   executing instructions in the transformation module to create the one or more advanced machine learning models combining functionalities provided by the privacy module, the security module, the equality module, transparency module, and the accuracy enhancement module; and
   executing instructions in a cryptography module to provide encryption keys associated with the one or more advanced machine learning models to the one or more users.

19. The computerized method of claim 18, wherein the method further comprises:
   receiving input from the one or more users, wherein the input is associated with the execution of the one or more advanced machine learning models; and in response to receiving the input from the one or more users, executing the one or more advanced machine learning models, wherein upon execution the one or more advanced machine learning models produce an outcome.

20. The computerized method of claim 19, wherein in response to executing the one or more advanced machine learning models, the differential privacy capabilities of the one or more advanced machine learning models causes the one or more advanced machine learning models to:

receive sample data from at least user different from the one or more users;

identify that the sample data is not from a distribution;

in response to identifying that the sample data is not from the distribution, dynamically generate random noise data; and provide an output to the at least one user, wherein the output comprises the random noise data.

* * * * *